United States Patent
Spahr et al.

(10) Patent No.: US 10,377,846 B2
(45) Date of Patent: Aug. 13, 2019

(54) PROCESSES FOR INCREASING DENSITY OF POLYMER FLAKES AND POWDERS

(71) Applicant: Arkema Inc., King of Prussia, PA (US)

(72) Inventors: Timothy A. Spahr, Galesville, WI (US); Angelo Pedicini, Lansdale, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/523,439

(22) PCT Filed: Oct. 29, 2015

(86) PCT No.: PCT/US2015/057926
§ 371 (c)(1),
(2) Date: May 1, 2017

(87) PCT Pub. No.: WO2016/089509
PCT Pub. Date: Jun. 9, 2016

(65) Prior Publication Data
US 2017/0306075 A1    Oct. 26, 2017

Related U.S. Application Data

(60) Provisional application No. 62/074,205, filed on Nov. 3, 2014.

(51) Int. Cl.
| | | |
|---|---|---|
| *C08G 4/00* | (2006.01) |
| *C08J 3/12* | (2006.01) |
| *C08G 65/40* | (2006.01) |
| *B29B 9/12* | (2006.01) |
| *B29B 13/10* | (2006.01) |
| *B33Y 70/00* | (2015.01) |
| *B29B 13/00* | (2006.01) |
| *B29B 9/04* | (2006.01) |
| *B29K 71/00* | (2006.01) |

(52) U.S. Cl.
CPC .................. *C08G 4/00* (2013.01); *B29B 9/12* (2013.01); *B29B 13/00* (2013.01); *B29B 13/10* (2013.01); *B33Y 70/00* (2014.12); *C08G 65/4012* (2013.01); *C08J 3/12* (2013.01); *B29B 9/04* (2013.01); *B29B 2009/125* (2013.01); *B29K 2071/00* (2013.01); *C08G 2650/40* (2013.01); *C08J 2371/00* (2013.01)

(58) Field of Classification Search
CPC .................................. C08L 27/00; C08G 4/00
USPC .......................................................... 528/220
See application file for complete search history.

(56) References Cited

U.S. PATENT DOCUMENTS

| | | |
|---|---|---|
| 3,690,569 A | 9/1972 | Leverett |
| 4,434,118 A | 2/1984 | Lin |
| 4,873,368 A | 10/1989 | Kadowaki et al. |
| 7,842,254 B2 | 11/2010 | Singh et al. |
| 2006/0134419 A1 | 6/2006 | Monshimer et al. |
| 2008/0021242 A1 | 1/2008 | Tanimoto et al. |
| 2008/0269521 A1 | 10/2008 | Hammon et al. |
| 2012/0263953 A1 | 10/2012 | Towle |

FOREIGN PATENT DOCUMENTS

| | | |
|---|---|---|
| EP | 0 911 313 A1 | 4/1999 |
| EP | 2 123 430 A1 | 11/2009 |
| WO | WO 2005/061414 A1 | 7/2005 |
| WO | WO 2013/148081 A1 | 10/2013 |
| WO | WO 2014/095676 A1 | 6/2014 |

*Primary Examiner* — Duc Truong
(74) *Attorney, Agent, or Firm* — Lynn B. Morreale

(57) ABSTRACT

The present disclosure is directed to improved poly(arylene ether ketone) powders for use in laser sintering, powder coating, compression molding, or transfer molding.

17 Claims, No Drawings

PROCESSES FOR INCREASING DENSITY OF POLYMER FLAKES AND POWDERS

CROSS-REFERENCE TO RELATED APPLICATIONS

This application is a national stage application under 35 U.S.C. § 371 of PCT/US2015/057926 filed Oct. 29, 2015, which claims benefit to U.S. patent application Ser. No. 62/074,205, filed Nov. 3, 2014.

TECHNICAL FIELD

The present disclosure is directed to improved poly (arylene ether ketone) (PAEK) powders, especially polyetherketoneketon (PEKK) powders, for use in laser sintering, powder coating, compression molding, or transfer molding.

BACKGROUND

Poly(arylene ether ketone)s (PAEKs) are high-performance materials with high thermomechanical properties. These polymers can withstand high temperature, mechanical, and chemical stresses, and are useful in the aeronautic, off-shore drilling, automotive, and medical device fields. Powders of these polymers can be processed by moulding, extrusion, compression, spinning, or laser sintering.

Laser sintering is an additive manufacturing process for forming an object wherein layers of a powder are selectively sintered at positions corresponding to a cross-section of the object using a laser. While PAEK powders are particularly well-suited for forming high-performance objects using laser sintering processes, the resulting objects tend to have a rough appearance and texture. Methods for forming PAEK-based articles having a smoother appearance and texture, while maximizing high performance characteristics such as mechanical properties are needed.

SUMMARY

The present disclosure is directed to methods comprising comminuting a sheet, the sheet formed by compacting a first poly(arylene ether ketone) (PAEK) powder or a first mixture of PAEK powders, to form a second PAEK powder or second mixture of PAEK powders; wherein the second PAEK powder or second mixture of PAEK powders has a median particle diameter of between about 10 microns and about 2000 microns and a bulk density that is at least 9% greater, as compared to an uncompacted PAEK powder or mixture of PAEK powders having a median particle diameter of between about 10 microns and about 2000 microns. Powders produced according to these methods are also described, as well as articles produced using these powders. The methods are especially suitable for producing polyetherketoneketone (PEKK) powders.

DETAILED DESCRIPTION OF ILLUSTRATIVE EMBODIMENTS

The disclosed compositions and methods may be understood more readily by reference to the following detailed description. It is to be understood that the disclosed compositions and methods are not limited to the specific compositions and methods described and/or shown herein, and that the terminology used herein is for the purpose of describing particular embodiments by way of example only and is not intended to be limiting of the claimed compositions and methods.

Reference to a particular numerical value includes at least that particular value, unless the context clearly dictates otherwise. When a range of values is expressed, another embodiment includes from the one particular value and/or to the other particular value. Further, reference to values stated in ranges include each and every value within that range. All ranges are inclusive and combinable.

When values are expressed as approximations, by use of the antecedent "about," it will be understood that the particular value forms another embodiment.

The term "about" when used in reference to numerical ranges, cutoffs, or specific values is used to indicate that the recited values may vary by up to as much as 10% from the listed value. As many of the numerical values used herein are experimentally determined, it should be understood by those skilled in the art that such determinations can, and often times will, vary among different experiments. The values used herein should not be considered unduly limiting by virtue of this inherent variation. Thus, the term "about" is used to encompass variations of ±10% or less, variations of ±5% or less, variations of ±1% or less, variations of ±0.5% or less, or variations of ±0.1% or less from the specified value.

It is to be appreciated that certain features of the disclosed compositions and methods which are, for clarity, described herein in the context of separate embodiments, may also be provided in combination in a single embodiment. Conversely, various features of the disclosed compositions and methods that are, for brevity, described in the context of a single embodiment, may also be provided separately or in any subcombination. All publications, patent applications, patents and other references mentioned herein are incorporated by reference in their entirety.

Laser sintered objects having a smoother appearance and texture, and a higher tensile strength, can be prepared from PAEK powders of the invention. These objects can be achieved by using a PAEK powder, or mixture of PAEK powders, having a higher bulk density than that previously used or described in the art.

Accordingly, the disclosure is directed to methods comprising comminuting a sheet that was formed by compacting a first PAEK powder or a first mixture of PAEK powders, to form a second PAEK powder or second mixture of PAEK powders. According to these methods, the second PAEK powder or second mixture of PAEK powders has a median particle diameter of between about 10 microns and about 2000 microns and a bulk density that is at least 9% greater, as compared to a control powder, i.e., an uncompacted PAEK powder or mixture of PAEK powders having a median particle diameter of between about 10 microns and about 2000 microns.

In some embodiments, the second PAEK powder or second mixture of PAEK powders has a median particle diameter of between about 10 microns and about 2000 microns and a bulk density that is between 9% and 200% greater, between 9% and 150% greater, between 9% and 100% greater, between 9% and 75% greater, between 9% and 50% greater, between 9% and 40% greater, between 9% and 35% greater, between 9% and 30% greater, between 9% and 25% greater, or between 9% and 20% greater, as compared to an uncompacted PAEK powder or mixture of PAEK powders having a median particle diameter of between about 10 microns and about 2000 microns. In preferred embodiments, the second PAEK powder or second mixture of PAEK powders has a median particle diameter of between about 10 microns and about 2000 microns and a bulk density that is at least 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75% greater, as compared to an uncompacted PAEK powder or mixture of PAEK powders having a median particle diameter of between about 10 microns and about 2000 microns.

Poly(arylene ether ketone) (PAEK) polymers include polyetheretheretherketone (PEEEK), polyetheretherketone (PEEK), polyetherketone (PEK), polyetherketone etherketoneketone (PEKEKK), and polyetherketoneketone (PEKK) polymers. PEKK polymers are particularly preferred. Polymers for use in the present invention can include, as repeating units, two different isomeric forms of ketone-ketone linkages. These repeating units can be represented by the following Formulas I and II:

-A-C(=O)—B—C(=O)—    I

-A-C(=O)-D-C(=O)—    II wherein A is a p,p'-Ph-O-Ph group, Ph is a phenylene radical, B is p-phenylene, and D is m-phenylene. The Formula I:Formula II isomer ratio, commonly referred to as the terephthaloyl:isophthaloyl (T:I) ratio in the polymer can be selected so as to vary the total crystallinity of the polymer. The T:I ratio is commonly varied from 50:50 to 90:10, and in some embodiments, 60:40 to 80:20. A higher T:I ratio such as, for example, 80:20, provides a higher degree of crystallinity as compared to a lower T:I ratio, such as, for example 60:40. Preferred T:I ratios include 80:20, 70:30, and 60:40, with 60:40 being particularly preferred. Mixtures of PAEK polymers, including PEKK polymers, having different T:I ratios are also within the scope of the disclosure.

Mixtures of PAEK powders are also envisioned for use in the present disclosure. For example, a powder can include PEKK, representing more than 50% by weight of the powder, preferably more than 80% by weight of the powder, in combination with another PAEK polymer, for example, PEEEK, PEEK, PEK, or PEKEKK, or a mixture thereof.

The PAEK powders, or mixtures of powders, can be obtained by the processes described in for example, U.S. Pat. Nos. 3,065,205; 3,441,538; 3,442,857; 3,516,966; 4,704,448; 4,816,556; and 6,177,518; incorporated herein by reference. They can, where appropriate, comprise one or more additives, such as fillers, in particular inorganic fillers such as carbon black, carbon or non-carbon nanotubes, milled or unmilled fibers, stabilizing agents (light-stabilizing, in particular UV-stabilizing, and heat-stabilizing), flow-facilitating agents, such as silica, or else optical brighteners, dyes or pigments, or a combination of these fillers and/or additives. In some embodiments, the PAEK powders can include up to 20 wt. %, preferably up to 10 wt. %, of additives. In preferred embodiments, the PAEK powders, including PEKK powders, are substantially free or free of additives. For example, in such embodiments, the PAEK powders or PEKK powders, include 5 wt. % or less, preferably 4 wt. % or less, 3 wt. % or less, 2 wt. % or less, or 1 wt. % of less, of additives. Suitable polymers for use in the disclosure are supplied by Arkema.

In preferred methods of the disclosure, the sheet formed from the first PAEK powder or the first mixture of PAEK powders is compacted at a pressure of about 500 psi or greater. In some embodiments, the pressure is between about 500 psi and about 1500 psi. In other embodiments, the pressure is between about 500 psi and about 1100 psi. In still other embodiments, the pressure is between about 800 and about 1100 psi. In exemplary embodiments, the pressure is about 500, 600, 700, 800, 900, 1000, 1100, 1200, 1300, 1400, or 1500 psi. A preferred compaction method is roll compaction, which is known in the art. As used herein, "sheet" refers to a substantially continuous material that has been compressed to thickness of 0.5 cm or less, for example, about 0.5 cm, about 0.4 cm, about 0.3 cm, or about 0.2 cm.

In one preferred method of the disclosure, the sheet formed from the first PAEK powder or the first mixture of PAEK powders is compacted at a temperature sufficient to soften but not to melt the PAEK. In some embodiments, the temperature is between room temperature and plus 30 degrees C. above Tg, or between room temperature and 200° C., or between room temperature and 160° C. In other embodiments, particularly for PEKK, the temperatures is between room temperature and 200° C., or preferably between about room temperature and 160° C. In these embodiments, the elevated temperature is maintained and/or adjusted as a variable during compaction and prior to comminuting. For example, this can be achieved by heating the rolls during compaction or pre-heating the material (powder or pellets).

According to the disclosure, the sheet is comminuted to form the second PAEK powder or second mixture of PAEK powders. As used herein, "comminuting" refers to processes by which sheets of the disclosure are converted to powders. Preferred comminuting methods include grinding and air milling. According to the disclosure, "comminuting" includes one or more comminuting iterations. In some embodiments, comminuting includes two comminuting iterations. In those embodiments, the sheet is comminuted in a first iteration to form powders having a particular median particle size. Those powders can then be comminuted in a second iteration to form powders having a smaller median particle size. That is, the disclosure encompasses a comminuting step performed directly on the sheet. In addition, the disclosure encompasses a comminuting step performed on a powder that has been previously prepared by comminuting the sheet.

As used herein, "powder" refers to a material composed of small particles, for example, granules, flakes, or pellets, of PAEK or mixture of PAEKs. The powder particles have a median particle diameter (D50) of about 2000 microns or less, preferably about 10 microns to about 2000 microns. More preferably, powder particles have a median particle diameter of between 10 microns and 150 microns, for example, 10 microns to 100 microns, 25 microns to 75 microns, 40 microns to 60 microns, or 45 microns to 55 microns, with about 50 microns being particularly preferred. Alternatively, the powder particles have a median particle diameter of between about 250 microns and about 2000 microns, for example, between 400 and 1500 microns.

Median particle diameter can be determined using methods known in the art, for example, laser diffraction or standardized mesh screening and classification. In preferred embodiments, standardized mesh screening and classification is used to determine the median particle diameter of particles having a mean particle diameter of between about 250 microns and about 2000 microns. The particle size of particles smaller than about 250 micron is preferably determined using laser diffraction. A preferred laser diffraction instrument is a Malvern Mastersizer 1000.

According to the disclosure, the bulk density of the second PAEK powder or second mixture of PAEK powers is 0.30 g/cm$^3$ or greater, for example, greater than 0.30 g/cm$^3$, 0.31 g/cm³ or greater, 0.32 g/cm³ or greater, 0.33 g/cm³ or greater, 0.34 g/cm³ or greater, 0.35 g/cm³ or greater, 0.36 g/cm³ or greater, 0.37 g/cm³ or greater, 0.38 g/cm³ or greater, 0.39 g/cm³ or greater, or 0.40 g/cm³ or greater. Preferably, the bulk density of the second PAEK powder or second mixture of PAEK powers is between 0.30 g/cm³ and 0.90 g/cm³, for example, between 0.31 g/cm³ and 0.90 g/cm³. In some embodiments, the bulk density of the second PAEK powder or second mixture of PAEK powers is between 0.30 g/cm³ and 0.50 g/cm³ or between 0.30 g/cm³ and 0.40 g/cm³. Most preferably, the bulk density of the second PAEK powder or second mixture of PAEK powers is 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, or 0.60 g/cm³. As used here, "bulk density," also referred to in the art as "apparent density" can be determined using ASTM D1895, the most recent standard in effect at the time of the filing of this disclosure.

In particularly preferred embodiments, the second PAEK powder or second mixture of PAEK powders has a median particle size of between about 250 microns and 2000 microns and a bulk density of greater than 0.30 g/cm³, for example, 0.31 g/cm³ or greater, 0.32 g/cm³ or greater, 0.33 g/cm³ or greater, 0.34 g/cm³ or greater, 0.35 g/cm³ or greater, 0.36 g/cm³ or greater, 0.37 g/cm³ or greater, 0.38 g/cm³ or greater, 0.39 g/cm³ or greater, or 0.40 g/cm³ or greater. In certain embodiments, the second PAEK powder or second mixture of PAEK powders has a median particle size of between about 250 microns and 2000 microns and a bulk density of greater than 0.30 g/cm³ and up to 0.90 g/cm³, for example, between 0.31 g/cm³ and 0.90 g/cm³, between 0.32 g/cm³ and 0.90 g/cm³, between 0.33 g/cm³ and 0.90 g/cm³, between 0.34 g/cm³ and 0.90 g/cm³, between 0.35 g/cm³ and 0.90 g/cm³, or between 0.36 g/cm³ and 0.90 g/cm³.

In other preferred embodiments, the second PAEK powder or second mixture of PAEK powders has a median particle size of between about 10 microns and 150 microns and a bulk density of 0.30 g/cm³ or greater, for example, 0.31 g/cm³ or greater, 0.32 g/cm³ or greater, 0.33 g/cm³ or greater, 0.34 g/cm³ or greater, 0.35 g/cm³ or greater, 0.36 g/cm³ or greater, 0.37 g/cm³ or greater, 0.38 g/cm³ or greater, 0.39 g/cm³ or greater, or 0.40 g/cm³ or greater. In certain embodiments, the second PAEK powder or second mixture of PAEK powders has a median particle size of between 10 microns and 150 microns, 25 microns to 75 microns, 40 microns to 60 microns, or 45 microns to 55 microns, and a bulk density of between 0.30 g/cm³ and 0.90 g/cm³, for example, between 0.31 g/cm³ and 0.90 g/cm³, between 0.32 g/cm³ and 0.90 g/cm³, between 0.33 g/cm³ and 0.90 g/cm³, between 0.34 g/cm³ and 0.90 g/cm³, between 0.35 g/cm³ and 0.90 g/cm³, or between 0.36 g/cm³ and 0.90 g/cm³.

The second PAEK powders or second mixture of PAEK powders have flow properties that are improved, as compared to powders not prepared by comminuting a sheet formed by compacting a first PAEK powder or a first mixture of PAEK powders. For example, the second PAEK powders or second mixture of PAEK powders have improved pourability, lower basic flow energy, better flow, and/or are more resistant to caking, as compared to control powders, i.e., those not prepared by comminuting a sheet formed by compacting a PAEK powder or a mixture of PAEK powders. Various powder flow properties, also referred to as powder rheology, can be analyzed using a rheometer such as the FT4™ Powder Rheometer (Freeman Technology, Medford, N.J.).

The PAEK powders or mixture of PAEK powders according to the disclosure can be used in thermoplastic applications directly. Alternatively, the PAEK powders or mixture of PAEK powders according to the disclosure can be further processed, for example, by mixing, prior to being used in a thermoplastic application.

PAEK powders or mixture of PAEK powders according to the disclosure are particularly useful in applications such as laser sintering, powder coating, compression molding, or transfer molding. As such, the disclosure also includes methods comprising laser sintering, powder coating, compression molding, or transfer molding a PAEK powder or mixture of PAEK powders having a median particle diameter of between 10 microns to 150 microns and a bulk density of 0.30 g/cm³ or greater; to produce an article. These PAEK powders and mixtures of PAEK powders can be prepared, for example, according to the disclosure. Articles produced by laser sintering, powder coating, compression molding, or transfer molding the powders of the disclosure are also envisioned.

Particularly preferred applications for the PAEK powders or mixture of PAEK powders of the disclosure are laser sintering applications. Laser sintering applications are useful in additive manufacturing processes. These methods are known in the art, per se. See, e.g., O. G. Ghita et al., J. Materials Processing Tech. 214 (2014) 969-978; U.S. Pat. No. 7,847,057; U.S. Published Application Nos. 2008/0258330; 2009/017220; 2009/312454; 2005/0207931; 2007/0267766; 2008/0152910; incorporated herein by reference. Particularly useful PAEK powders or PEKK powders, or mixtures of PAEK and PEKK powders include those having a median particle diameter of between 10 and 100 microns, 25 to 75 microns, 40 to 60 microns, or 45 to 55 microns, with about 50 microns being most preferred. These powders will having a bulk density of 0.30 g/cm³ or greater, for example, 0.30 g/cm³ to 0.90 g/cm³, as described herein.

Articles prepared by laser sintering, powder coating, compression molding, or transfer molding the powders of the disclosure will have improved tensile strength, as compared to articles prepared using control powders not prepared according to the methods of the disclosure. Articles prepared by laser sintering, powder coating, compression molding, or transfer molding the powders of the disclosure will have improved appearance properties, for example, improved smoothness and/or texture, as compared to articles prepared using control powders not prepared according to the methods of the disclosure.

For example, articles prepared by laser sintering the powders of the disclosure will have improved surface roughness properties. "Surface roughness," can be quantified using Ra (µm), which can be determined using surface roughness testing apparatuses known in the art, for example, MITUTOYO SURFTEST SJ-201. Improvements in surface roughness can also be visually ascertained.

The following examples are provided to illustrate compositions, processes, and properties described herein. The examples are merely illustrative and are not intended to limit the disclosure to the materials, conditions, or process parameters set forth therein.

EXAMPLES

Example 1

Approximately 100 lb/hr of a PAEK powder (KEPSTAN® 6003PF polymer, particle size~100-2000 microns, Arkema) was roll compacted using the conditions set forth in Table 1.

TABLE 1

| Settings | control | 1 | 2 | 3 | 4 | 5 | 6 | 7 | 8 |
|---|---|---|---|---|---|---|---|---|---|
| Roll Pressure (psi) | | 800 | 800 | 800 | 1100 | 1100 | 1100 | 1100 | 1100 |
| Roll Force (lb/lin. ft) | | 7436 | 7436 | 7436 | 10224 | 10224 | 10224 | 10224 | 10224 |
| Roll Gap (in.) | 0.022 | 0.040 | 0.04-0.057 | 0.043-0.057 | 0.040-0.053 | 0.043-0.049 | 0.043 | 0.043-0.049 | 0.037-0.047 |
| Roll Speed (rpm) | | 8 | 8 | 8 | 9 | 18 | 9 | 18 | 9 |
| VFS Speed (rpm) | | 275 | 325 | 325 | 325 | 325 | 325 | 325 | 325 |
| HFS Speed (rpm) | | 20 | 20 | 20 | 26 | 52 | 28 | 52 | 28 |
| Rotor Speed (rpm) | | — | 2000 | 2200 | 2200 | 2200 | 2200 | 2200 | 2200 |
| screen size (in.) | | — | 0.187 | 0.125 | 0.125 | 0.125 | 0.125 | 0.125 | 0.125 |
| Screen type | | — | round | round | round | round | round | round | round |
| Rolls % Load | 72 | 97 | 97 | 83 | 117-135 | 114 | 100 | 108 | 95-114 |
| VFS % Load | 56 | 63 | 63 | 63 | 67 | 67 | 63 | 63 | 63 |
| HFS % Load | 56 | 63 | 63 | 63 | 63 | 63 | 63 | 63 | 63 |
| Mill % Load | 30 | 0 | 30 | 30 | 32 | 32 | 30 | 30 | 30 |
| Run time (mm:sec) | | 0:30 | 2:00 | 2:05 | 2:00 | 2:00 | 2:00 | 13:00 | 2:00 |
| Quantity Processed (lb) | | 0.7 | 2.6 | 2.5 | 4.2 | 7.7 | 3.6 | 58 | 4.3 |
| Production Rate (lb/hr) | | 79 | 77 | 73 | 125 | 232 | 108 | 268 | 130 |
| Product Temp (° F.) | | 113 | 87 | 85 | 97 | 107 | 101 | 128 | 96 |

The compacted sheets were ground according to Table 2. Bulk densities of the resulting powders are also set forth in Table 2.

TABLE 2

Particle Size Distribution (% Retained on)

| Mesh | Micron | Control | 2 | 3 | 4 | 5 | 6 | 7 | 8 |
|---|---|---|---|---|---|---|---|---|---|
| 10 | 2000 | 1.6 | 4.2 | 0.2 | 0.4 | 0.6 | 0.8 | 0.4 | 0.2 |
| 14 | 1410 | 23.5 | 20.1 | 12.0 | 10.9 | 13.9 | 7.4 | 9.2 | 11.4 |
| 20 | 840 | 31.6 | 43.0 | 44.4 | 38.9 | 39.2 | 17.3 | 36.1 | 36.4 |
| 40 | 420 | 12.4 | 17.9 | 20.6 | 22.4 | 20.4 | 34.1 | 23.6 | 17.1 |
| 60 | 250 | 11.6 | 8.0 | 11.4 | 12.9 | 11.9 | 19.1 | 14.6 | 10.9 |
| −60 | 250 | 19.3 | 6.8 | 11.4 | 14.5 | 14.1 | 21.3 | 16.0 | 24.0 |
| bulk density (g/cm$^3$) | | 0.30 | 0.36 | 0.37 | 0.40 | 0.40 | 0.41 | 0.40 | 0.40 |

Example 2

Powders from Example 1 are further milled to a powder having a mean particle diameter of between 45 microns and 100 microns. This powder has a bulk density of 0.30 g/cm$^3$.

Example 2A

Uncompacted KEPSTAN® 6003PF polymer is milled to a powder having a mean particle diameter of between 45 microns and 100 microns. This powder has a bulk density of 0.275 g/cm$^3$.

What is claimed:

1. A method comprising:
   comminuting a compacted sheet, the compacted sheet formed by compacting a first poly(arylene ether ketone) (PAEK) powder or a first mixture of PAEK powders, then subjecting said compacted sheet to comminution to form a second PAEK powder or second mixture of PAEK powders;
   wherein the second PAEK powder or second mixture of PAEK powders has a median particle diameter of between about 10 microns and about 2000 microns and a bulk density that is at least 9% greater, as compared to an uncompacted PAEK powder or mixture of PAEK powders having a median particle diameter of between about 10 microns and about 2000 microns.

2. The method of claim 1, wherein the particle size of the first and second powder(s) or mixture of powders is between about 250 microns and about 2000 microns.

3. The method of claim 1, wherein the particle size of the first and second powder(s) or mixture of powders is between about 10 microns and 150 microns.

4. The method of claim 1, wherein the sheet is compacted at a pressure of about 500 psi or greater.

5. The method of claim 1, wherein the PAEK is polyetherketoneketone (PEKK).

6. The method of claim 1, wherein the bulk density of the second powder or mixture of powders is 0.30 g/cm$^3$ or greater.

7. The method of claim 1, wherein the bulk density of the second powder or mixture of powders is 0.32 g/cm$^3$ or greater.

8. The method of claim 1, wherein the bulk density of the second powder or mixture of powders is 0.36 g/cm$^3$ or greater.

9. The method of claim 1, wherein the compacting is by roll compacting.

10. The method of claim 1, wherein the PAEK is polyetherketoneketone (PEKK) and said sheet is formed at a temperature between room temperature and plus 30° C. above Tg.

11. The method of claim 1, wherein the PAEK is polyetherketoneketone (PEKK) and said sheet is formed at a temperature between room temperature and 200° C.

12. The method of claim 1, wherein the PAEK is polyetherketoneketone (PEKK) and said sheet is formed at a temperature between about room temperature and 160° C.

13. The method claim 1, wherein the sheet is formed at a temperature that is maintained and/or adjusted as a variable during compaction prior to comminuting.

14. The method of claim 1, wherein said second powder is PEKK having a median particle diameter between about 10 microns and about 150 microns and a bulk density of 0.3 g/cm$^3$ or greater.

15. The method of claim 1, wherein said second powder is PEKK having a median particle diameter of between about 45 microns and about 55 microns and a bulk density of 0.3 g/cm$^3$ or greater.

16. The method of claim 1, wherein said first and second PAEK powder and/or second mixture of PAEK powders are substantially free or free of additional flow aids and/or additives.

17. The method of claim 5 wherein said PEKK is semi crystalline and has a T:I ratio from 80:20 to 60:40.

* * * * *